(12) United States Patent
Moroto et al.

(10) Patent No.: US 6,502,557 B2
(45) Date of Patent: Jan. 7, 2003

(54) CHECK VALVE FOR ENGINE FUEL SUPPLY SYSTEM

(75) Inventors: Kiyonori Moroto, Kariya (JP); Motoya Ito, Hekinan (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 09/805,505

(22) Filed: Mar. 14, 2001

(65) Prior Publication Data

US 2001/0022172 A1 Sep. 20, 2001

(30) Foreign Application Priority Data

Mar. 17, 2000 (JP) ........................................ 2000-076035

(51) Int. Cl.[7] .......................... F02M 37/08; F16K 17/26
(52) U.S. Cl. .................. 123/506; 137/493.2; 137/493.9
(58) Field of Search ................................. 123/445, 446, 123/457, 467, 506, 511; 137/493.9, 493.2; 417/296, 307

(56) References Cited

U.S. PATENT DOCUMENTS

| 120,519 A | * | 10/1871 | Hibberd ..................... 137/493.2 |
| 1,402,218 A | * | 1/1922 | Cushing ............... 137/493.2 X |
| 1,835,979 A | * | 12/1931 | Ernst et al. ........... 137/493.2 X |
| 2,090,781 A | * | 8/1937 | Camner ................... 123/446 X |
| 2,234,924 A | * | 3/1941 | Green ..................... 417/296 X |
| 2,247,421 A | * | 7/1941 | Tabb et al. .................. 123/446 |
| 3,340,860 A | * | 9/1967 | Groschel et al. ............. 123/457 |
| 3,986,795 A | * | 10/1976 | Kranc et al. ................. 417/296 |
| 4,370,102 A | * | 1/1983 | Sasaki et al. ............... 417/296 |
| 4,378,815 A | * | 4/1983 | Mochida et al. ..... 137/493.2 X |
| 4,648,369 A | * | 3/1987 | Wannenwetsch ............ 123/467 |

FOREIGN PATENT DOCUMENTS

| JP | 7-286565 | 10/1995 |
| JP | 11-257174 | 9/1999 |

* cited by examiner

Primary Examiner—Tony M. Argenbright
(74) Attorney, Agent, or Firm—Nixon & Vanderhye P.C.

(57) ABSTRACT

When a pump operates, a check valve body leaves a check valve seat due to a pump side fuel pressure for opening a fluid passage inside a pressure adjusting valve body. When the pump does not operate, the check valve body contacts the check valve seat due to an engine side fuel pressure for closing the fluid passage. Thus, the engine side fuel is prevented from flowing-back to the pump. When the pump stops operating and the engine side fuel pressure exceeds a pressure corresponding to an urging force of a coil spring, the pressure adjusting valve body leaves the pressure adjusting valve seat with the check valve body, so that a gap is provided between the pressure adjusting valve body and the pressure adjusting valve seat for releasing the engine side fuel having excess pressure.

7 Claims, 4 Drawing Sheets

CHECK VALVE FOR ENGINE FUEL SUPPLY SYSTEM

CROSS REFERENCE TO RELATED APPLICATION

This application is based on and incorporates herein by reference Japanese Patent Application No. 2000-76035 filed on Mar. 17, 2000.

BACKGROUND OF THE INVENTION

1. Field of the Invention

The present invention relates to a check valve provided in an engine fuel supply system for preventing the fuel from flowing-back from an engine to a pump.

2. Description of Related Art

In a fuel supply system for a vehicle engine, a check valve is provided at a discharge side of a pump for preventing the fuel from flowing-back to the pump while the engine does not operate, so that pressure of the fuel remaining at the engine side is highly maintained approximately equal to a pressure during a pump operation.

In a conventional check valve, a single valve body is slidably contained in a housing. When the pump operates, the valve body is urged by pressure of the fuel discharged from the pump to open a valve opening. When the pump stops operating, the valve body is urged by pressure of the fuel remaining at the engine side to close the valve opening. While the pump does not operates, the valve body keeps on closing the valve opening, so that the fuel remaining at the engine side is prevented from flowing back to the pump. Thereby, the pressure of the fuel is highly maintained approximately equal to a pressure during a pump operation.

In view of an environmental protection, it is required to reduce a gas fuel leakage from the fuel supply system for a vehicle. The gas fuel leakage increases as the fuel pressure becomes high. Thus, when the engine does not operate, it is desired to maintain the fuel pressure as low as possible as long as the engine normally starts. Further, for improving an engine performance, it is required to increase a discharge pressure of a pump used for a fuel supply system.

However, when the engine stops operating, the conventional check valve still maintains the high fuel pressure at the engine operation. Further, just after the engine stops, the fuel inside the pipe is thermally expanded due to an engine heat, and the pressure thereof may rise over a fuel pressure at the engine operation. The conventional check valve does not suppress the rising of the fuel pressure.

SUMMARY OF THE INVENTION

A first object of the present invention is to decrease an engine side fuel pressure when a pump stops operating and maintain the engine side fuel pressure lower than a fuel pressure during the pump operation.

A second object of the present invention is to release the engine side fuel to the pump to prevent the engine side fuel pressure from rising abnormally even when the engine side fuel is thermally expanded due to an engine heat just after the engine stops.

According to the present invention, a check valve is provided in a fuel supply system for en engine, and the check valve comprises a valve casing, a pressure adjusting valve, an urging means, and a check valve body. The valve casing includes a first valve seat. The pressure adjusting valve body is slidably provided in the valve casing, and includes a fluid passage thereinside and a second valve seat. The urging means urges the pressure adjusting valve body toward the first valve seat. The check valve body is provided in the valve casing, and moves with respect to the second valve seat.

When the pump operates, the check valve body leaves the second valve seat due to a pump side fuel pressure for opening the fluid passage inside the pressure adjusting valve body. When the pump does not operate, the check valve body contacts the second valve seat due to an engine side fuel pressure for closing the fluid passage inside the pressure adjusting valve body, thereby preventing the engine side fuel from flowing-back to the pump. When the pump stops operating and the engine side fuel pressure exceeds a pressure corresponding to an urging force of the urging means, the pressure adjusting valve body leaves the first valve seat with the check valve body, so that a gap is provided between the pressure adjusting valve body and the first valve seat. The engine side fuel having the excess pressure is released through the gap. Further, when the fuel thermally expands due to an engine heat, the expanded fuel is released through the gap. In this way, the engine side fuel pressure is maintained at a pressure corresponding to the urging force of the urging means.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 6:
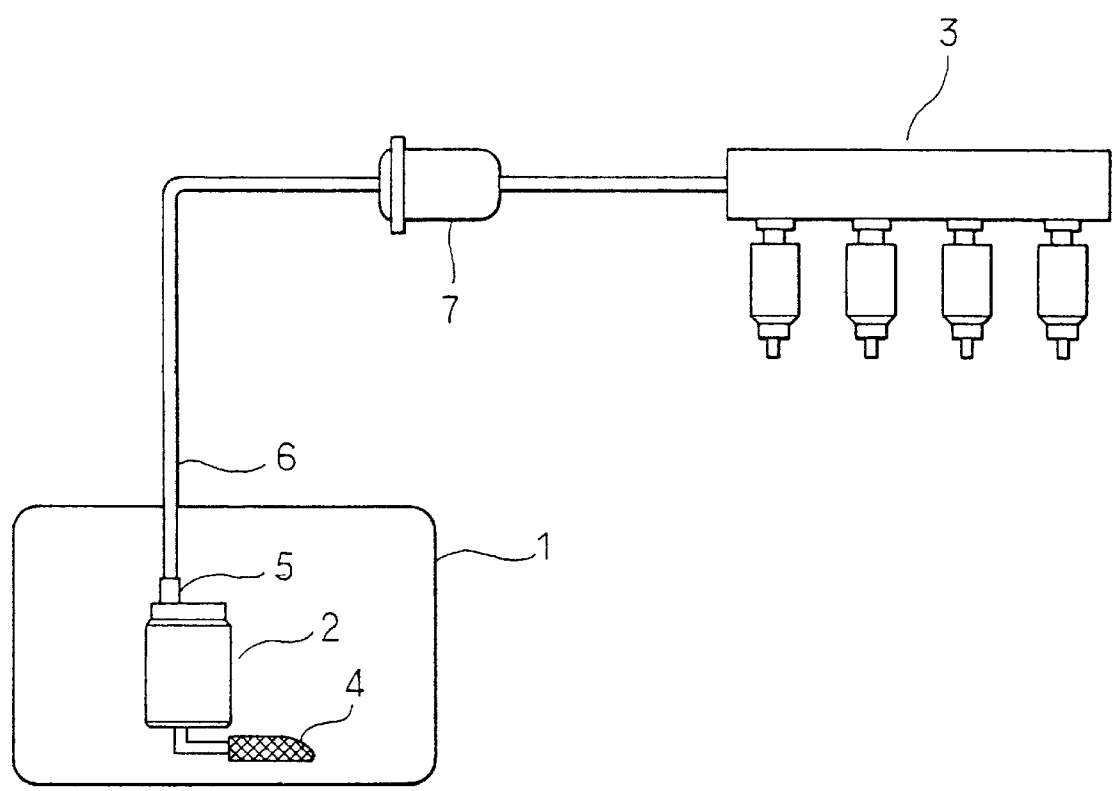
FIG. 6 is a schematic view showing a fuel supply system.

FIG. 6 shows a fuel supply system for a vehicle. The fuel supply system includes a fuel tank 1, a fuel pump apparatus 2, and a fuel injector 3. The fuel pump apparatus 2 suctions fuel from the fuel tank 1 through a filter 4, and discharges the fuel into a tube 6 through a fuel outlet 5 thereof. The tube 6 leads the fuel to the fuel injector 3 through a filter 7. The filter 7 purifies the fuel. The fuel injector 3 injects the fuel into an intake port of an engine (not illustrated).

Figure 5:
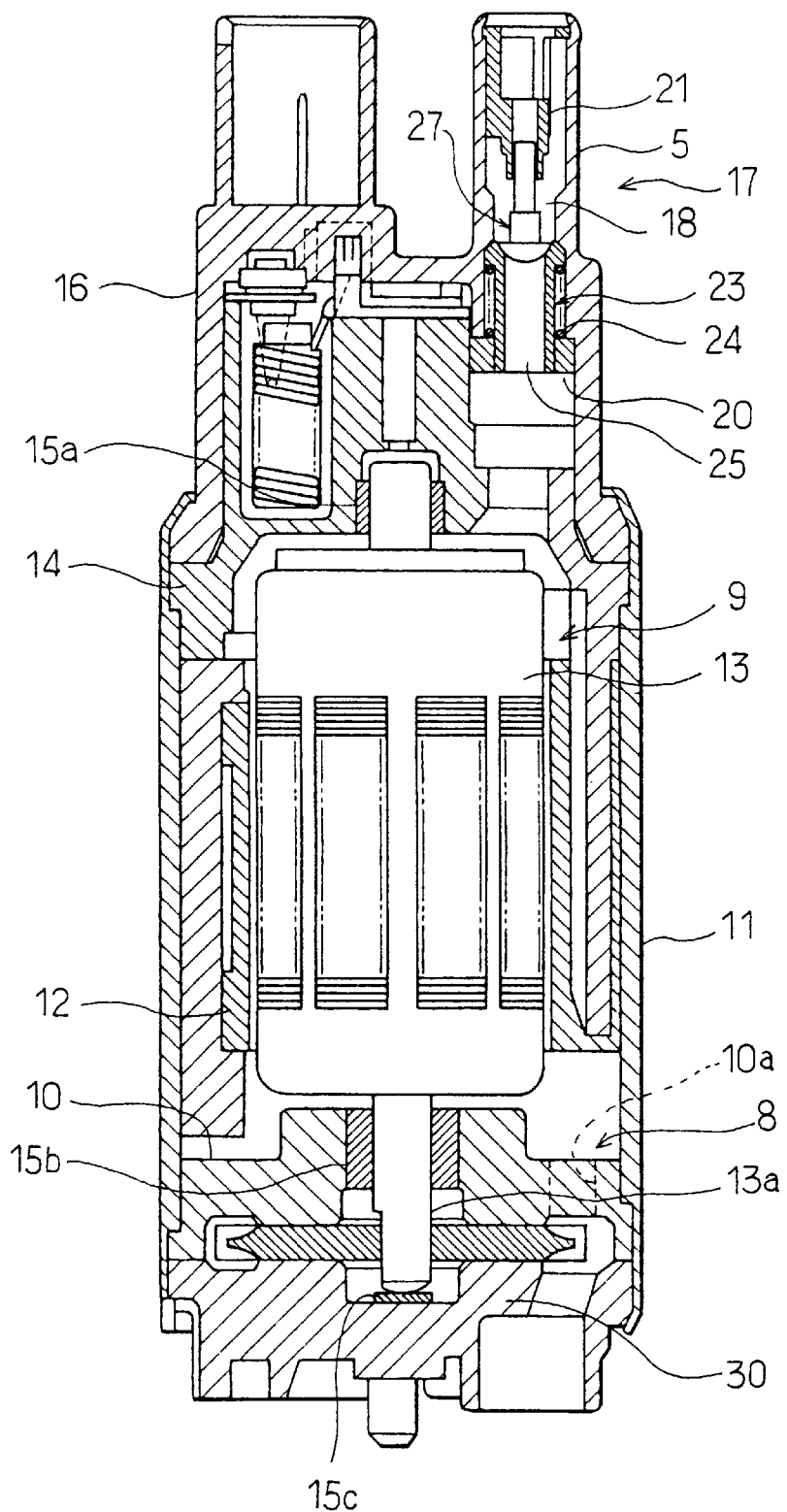
FIG. 5 is a cross-sectional view showing the pump.

As shown in FIG. 5, the fuel pump apparatus 2 includes a pump 8 and a motor 9 operating the pump 8. A pump casing 10 of the pump 8 is mechanically fixed to a lower end area of a cylindrical housing 11. The motor 9 is a DC motor having a brush. In the motor 9, a permanent magnet 12 is circularly disposed inside the housing 11, and an armature 13 is disposed radially inside the permanent magnet 12. A bearing holder 14 is press-inserted into an upper end area of the housing 11. A shaft 13a of the armature 13 is supported by radial bearings 15a, 15b and by a thrust bearing 15c. The radial bearing 15a is provided in the bearing holder 14, the radial bearing 15b is provided in the pump casing 10, and the thrust bearing 15c is provided in the pump cover 30.

The inside of the housing 11 includes a chamber for receiving a liquid fuel discharged from a discharge outlet 10a of the pump 8 and feeding the liquid fuel toward the fuel outlet 5. A cover end support 16 is provided above the bearing holder 14, and is mechanically fixed to the housing 11. The fuel outlet 5 is integrally formed in the cover end support 16.

Figure 3:
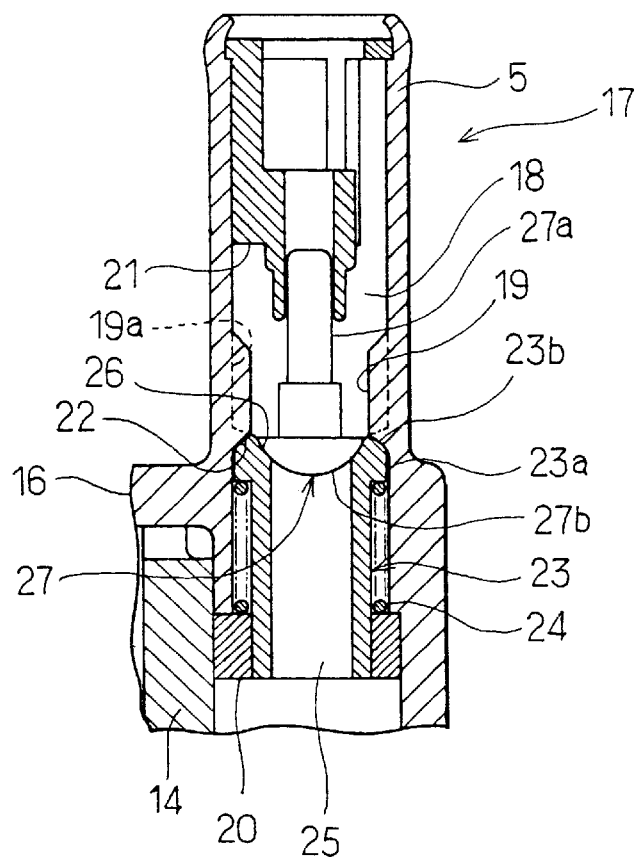
FIG. 3 is a cross-sectional view showing a check valve preventing fuel from flowing-back while the pump does not operate.

As shown in FIG. 3, a check valve 17 uses the fuel outlet 5 of the cover end support 16 as a valve casing thereof. The fuel outlet 5 is cylindrically formed, and the inside thereof is used as a fuel passage 18. That is, the lower end of the fuel outlet 5 is an inlet of the fuel passage 18, and the upper end of the fuel outlet 5 is an outlet of the fuel passage 18. A small diameter portion 19 is formed at an intermediate part of the fuel passage 18. A lower holder 20 is fixed to a lower side (inlet side) of the small diameter portion 19, and an upper holder 21 is fixed to an upper side (outlet side) of the small diameter portion 19. The lower holder 20 is formed in a ring, and the upper holder 21 is formed in a cylinder having a stage.

The lower end of the small diameter portion 19 is tapered to form a pressure adjusting valve seat 22. A pressure adjusting valve body 23 is provided under the small diameter portion 19 and seats on the pressure adjusting valve seat 22. The pressure adjusting valve body 23 includes a large diameter portion 23a at the upper area thereof, and is supported by the cover end support 16 such that the large diameter portion 23a vertically slides with respect to the inner surface of the fuel outlet 5. A lower portion of the pressure adjusting valve body 23 is inserted into and supported by the lower holder 20 to vertically slide therein. Further, the pressure adjusting valve body 23 includes a taper surface 23b at the top end thereof for seating on the pressure adjusting valve seat 22.

A coil spring 24 is provided between the large diameter portion 23a and the lower holder 20. The coil spring 24 urges the pressure adjusting valve body 23 upwardly. That is, the coil spring 24 urges the pressure adjusting valve body 23 toward the same direction as the fuel flows in the fuel passage 18 when the pump 8 operates. The taper surface 23b of the pressure adjusting valve body 23 contacts the pressure adjusting valve seat 22 due to the urging force of the coil spring 24. Therefore, the contact portion between the valve seat 22 and the pressure adjusting valve body 23 is firmly sealed.

The pressure adjusting valve body 23 is cylindrically formed, and includes a passage 25 thereinside, which communicates with the fuel passage 18 of the fuel outlet 5. Top end periphery of the passage 25 is formed in a spherical surface to provide a check valve seat 26. A check valve body 27 is provided above the pressure adjusting valve body 23, and seats on the check valve seat 26. The check valve body 27 includes a shaft 27a and a main body 27b. The main body 27b is formed at the lower end of the shaft 27a, and is formed in a spherical surface. The upper holder 21 supports the shaft 27a vertically slidably. When the pump 8 does not operate, the check valve body 27 is downwardly urged by gravity force and fuel pressure remaining at the fuel injector 3 to contact the check valve seat 26, thereby closing the passage 25 inside the pressure adjusting valve body 23.

An operation of the above-described check valve 17 will be explained.

When the engine and the fuel pump apparatus 2 do not operate, as shown in FIG. 3, the check valve body 27 contacts the check valve seat 26 to close the passage 25 inside the pressure adjusting valve body 23, and the pressure adjusting valve body 23 contacts the pressure adjusting valve seat 22 due to the urging force of the coil spring 24. The pressure adjusting valve body 23 and the check valve body 27 close an opening of the pressure adjusting valve seat 22 and the fuel passage 18 of the fuel outlet 5, for preventing fuel remaining at the fuel injector 3 from flowing back to the pump 8. Here, pressure of the fuel remaining at the injector 3 side (engine side) with respect to the check valve 27 is higher than pressure of the fuel remaining at the pump 8 side with respect to the check valve 27, and pressure difference therebetween corresponds to the urging force of the coil spring 24. Therefore, the engine side fuel pressure is adjusted to a required pressure by varying the urging force of the coil spring 24. In the present embodiment, the fuel pressure is set such that the engine normally starts.

Figure 2:
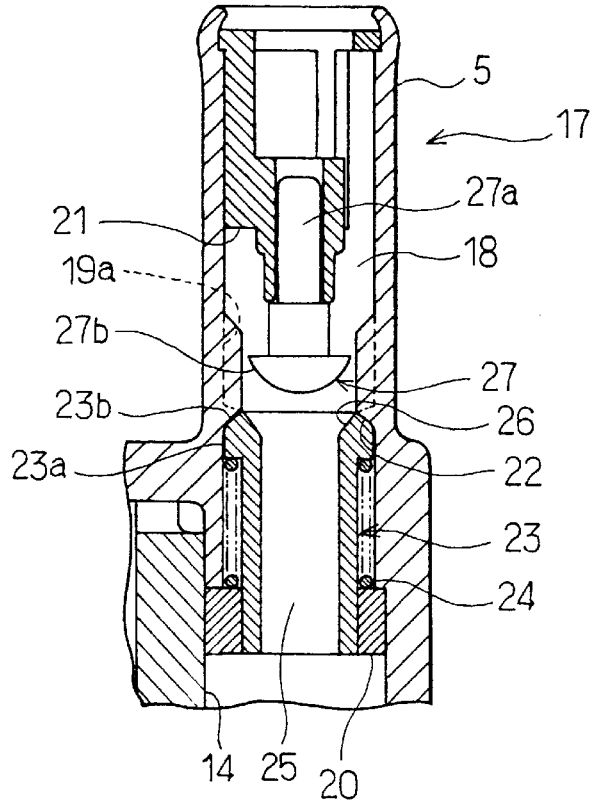
FIG. 2 is a cross-sectional view showing a check valve while the pump operates.

When the motor 9 is energized for starting the engine, the motor 9 operates the pump 8 to suction the fuel from the fuel tank 1 through the filter 4, and to discharge the fuel into the housing 11. When the high-pressure fuel is discharged from the pump 8, the fuel pressure acts on the bottom surface of the main body 27b of the check valve body 27 to push the check valve body 27 upwardly. Then, as shown in FIG. 2, the check valve body 27 leaves the check valve seat 26 to open the passage 25 inside the pressure adjusting valve body 23. The high pressure fuel passes through the fuel passage 18 of the fuel outlet 5, flows into the tube 6, is supplied to the fuel injector 3 through the filter 7, and is injected to the engine.

In this way, the engine starts. After that, while the engine operates, the check valve 17 maintains the check valve body 27 to be apart from check valve seat 26 for opening both passages 18 and 25, so that the fuel is allowed to flow toward the engine.

The small diameter portion 19 includes a plurality of grooves 19a at the inner surface thereof, and the grooves 19a vertically extend from just above the pressure adjusting valve seat 22. The grooves 19a provide enough passage area between the check valve body 27 and the small diameter portion 19 for allowing the fuel to flow smoothly.

When the engine and the pump 8 stop operating, fuel inside the pump 8 flows back to the fuel tank 1, so that the fuel pressure inside the housing 11 decreases. Thus, fuel remaining in the check valve 17 and in a fuel passage between the check valve 17 and the fuel injector 3 also flows back to the pump 8. The check valve body 27 moves downwardly due to the gravity force and the flowing back fuel pressure, and contacts the check valve seat 26. Thereby, the check valve body 27 closes the passage 25 inside the pressure adjusting valve body 23, so that the fuel is prevented from flowing back from the engine to the pump 8 through the passage 25.

Figure 1:
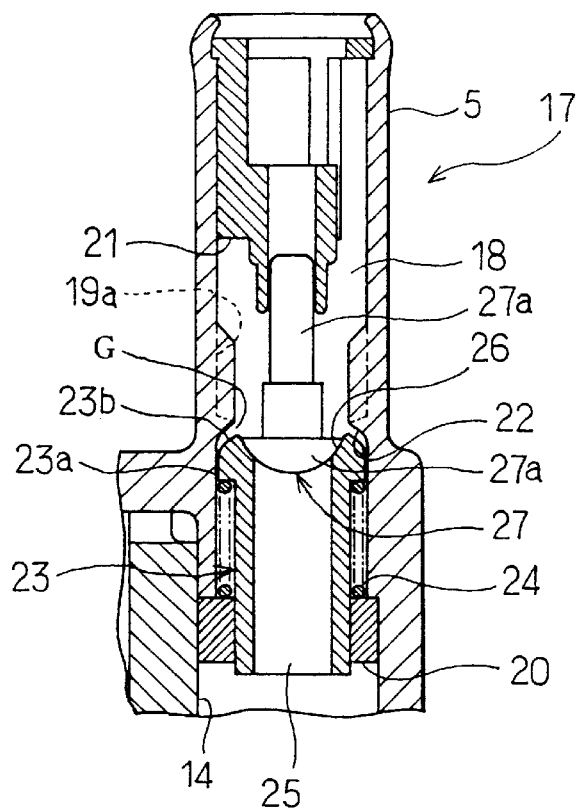
FIG. 1 is a cross-sectional view showing a check valve allowing fuel to flow-back just after a pump stops operating.

When the check valve body 27 closes the passage 25, pressure increases at the engine side of the check valve body 27, and decreases at the pump 8 side of the check valve body 27. When the pressure difference therebetween exceeds a value corresponding to the urging force of the coil spring 24, the pressure adjusting valve body 23 and the check valve body 27 are integrally pushed downwardly by the engine side fuel pressure. In this way, as shown in FIG. 1, the taper surface 23b of the pressure adjusting valve body 23 leaves the pressure adjusting valve seat 22, so that a gap G arises therebetween.

Here, there are slight gaps between the outer surface of the large diameter portion 23a of the pressure adjusting valve body 23 and the inner surface of the fuel outlet 5, and between the outer surface of the pressure adjusting valve body 23 and the inner surface of the lower holder 20, for allowing the pressure adjusting valve body 23 to vertically slide. Thus, when the gap G arises between the pressure adjusting valve seat 22 and the pressure adjusting valve body 23, the engine side fuel leaks through the gap G and flows back to the pump 8 through the slight gaps between the pressure adjusting valve body 23 and the inner surface of the fuel outlet 5, and between the pressure adjusting valve body 23 and the inner surface of the lower holder 20.

Therefore, the engine side pressure gradually decreases, and when the pressure difference between the engine side and the pump 8 side becomes a little lower than the value corresponding to the urging force of the coil spring 24, the pressure adjusting valve body 23 is pushed upwardly by the urging force of the coil spring 24. When the taper surface 23b of the pressure adjusting valve body 23 contacts the pressure adjusting valve seat 22, the contact portion between the pressure adjusting valve seat 22 and the pressure adjusting valve body 23 is firmly sealed, thereby preventing the engine side fuel from flowing back. As a result, the fuel pressure remaining at the engine side is maintained higher than the pump 8 side by a value corresponding to the urging force of the spring coil 24.

Even when the fuel remaining at the engine side is thermally expanded due to an engine heat just after the engine stops, the engine side fuel is released to the pump 8 side as described above, thereby preventing the engine side fuel pressure from rising abnormally.

Figure 4:
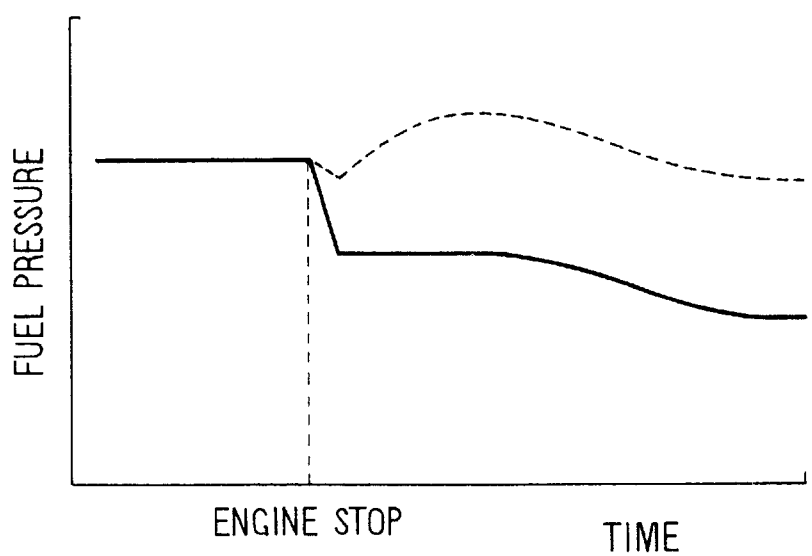
FIG. 4 is a graph showing change of engine side fuel pressure.

By the operation of the check valve 17 above described, as denoted by solid line in FIG. 4, the engine side fuel pressure abruptly decreases just after an engine stop, and after that, is approximately maintained at a constant pressure for preparing a next engine start.

In FIG. 4, broken line shows a change of pressure of fuel remaining at the engine side when a conventional check valve is used. Just after the engine stops, although the fuel pressure slightly decreases until the check valve has closed, the fuel pressure is approximately maintained at high pressure state of engine operation. After that, when the fuel is thermally expanded by the engine heat, the engine side fuel pressure further rises over the pressure at the engine operation. In this way, according to the conventional check valve, the engine side fuel pressure is maintained much higher than a pressure required for restart of the engine, so that gas fuel leak from the fuel system during the engine stop is not reduced.

However, according to the present embodiment, the engine side fuel pressure is relatively maintained as low as possible to satisfy a requirement for restart of the engine, so that gas fuel leak from the fuel system is reduced. After the engine stops, the engine side fuel pressure can be decreased as low as approximately minimum pressure required for an engine start regardless a fuel pressure at the engine operation. Thus, discharge pressure of the fuel pump apparatus 2 can be raised for further atomizing fuel injected from the fuel injector 3 into the engine.

According to the present embodiment, the pressure adjusting valve body 23 having the check valve seat 26 slides for releasing the engine side fuel pressure, so that area of the pressure adjusting valve body 23 receiving the engine side fuel pressure is as large as a valve opening of the pressure adjusting valve seat 22. Thus, large force urges the pressure adjusting valve body 23 downwardly, and the valve body 23 moves downwardly to open the valve opening. Therefore, even when the urging force of the coil spring 24 has some dispersion, the engine side fuel pressure is approximately constantly maintained when the pressure adjusting valve body 23 moves to open the valve opening, thereby reducing dispersion of the engine side fuel pressure maintained while the pump 8 stops.

(Modifications)

According to the above-described embodiment, when the gap G arises between the pressure adjusting valve seat 22 and the pressure adjusting valve body 23, pressure releasing passages through which the engine side fuel flows back to the pump are formed between the pressure adjusting valve body 23 and the inner surface of the fuel outlet 5, and between the pressure adjusting valve body 23 and the inner surface of the lower holder 20. Alternatively, the pressure releasing passages may be provided by forming a groove at the inner surface of the fuel outlet 5.

According to the above-described embodiment, the coil spring 24 works as an urging means for urging the pressure adjusting valve body 23. Alternatively, the urging means may include a block made of rubber.

What is claimed is:

1. A check valve comprising:
   a valve casing including a first valve seat;
   a pressure adjusting valve body slidably provided in said valve casing, said pressure adjusting valve body including a fluid passage thereinside and a second valve seat;
   an urging means for urging said pressure adjusting valve body toward said first valve seat; and
   a check valve body provided in said valve casing, said check valve body moving with respect to said second valve seat,
   wherein said check valve is provided in a fuel supply system including a pump, for an engine, and said check valve prevents fuel from flowing-back from said engine to said pump when said pump stops operating.

2. A check valve according to claim 1, wherein
   said valve casing includes a fuel passage through which the fuel discharged from said pump flows, and
   said first valve seat is formed in said fuel passage.

3. A check valve according to claim 1, wherein said urging means urges said pressure adjusting valve body toward a flowing direction of the fuel discharged from said pump for allowing said pressure adjusting valve to contact said first valve seat.

4. A check valve according to claim 1, wherein
   when said pump operates, said check valve body leaves said second valve seat due to a pump side fuel pressure for opening said fluid passage inside said pressure adjusting valve body, and
   when said pump does not operate, said check valve body contacts said second valve seat due to an engine side fuel pressure for closing said fluid passage inside said pressure adjusting valve body.

5. A check valve according to claim 4, wherein
   when said pump stops operating and the engine side fuel pressure exceeds a pressure corresponding to an urging force of said urging means, said pressure adjusting valve body leaves said first valve seat with said check valve body for providing a gap between said pressure adjusting valve body and said first valve seat, and
   fuel remaining at an engine side with respect to said check valve body is released through the gap.

6. A check valve used for a fuel supply system for an engine, which includes a pump feeding fuel from a fuel tank to the engine, for preventing the fuel from flowing-back from the engine to the pump when the pump stops operating, comprising:

a valve casing including a fuel passage through which the fuel discharged from said pump flows, and a first valve seat formed in said fuel passage;

a pressure adjusting valve body slidably provided in said valve casing, said pressure adjusting valve body including a fluid passage thereinside and a second valve seat;

an urging means for urging said pressure adjusting valve body toward a flowing direction of the fuel discharged from said pump for allowing said pressure adjusting valve body to contact said first valve seat; and a check valve body provided in said valve casing, said check valve body moving with respect to said second valve seat, said check valve body leaving said second valve seat, wherein when said pump operates, said check valve body leaves said second valve seat due to a pump side fuel pressure for opening said fluid passage inside said pressure adjusting valve body, when said pump does not operate, said check valve body contacts said second valve seat due to an engine side fuel pressure for closing said fluid passage inside said pressure adjusting valve body, when said pump stops operating and the engine side fuel pressure exceeds a pressure corresponding to an urging force of said urging means, said pressure adjusting valve body leaves said first valve seat with said check valve body for providing a gap between said pressure adjusting valve body and said first valve seat, and fuel remaining at an engine side with respect to said check valve body is released through the gap.

7. A fuel supply system for an engine, comprising:

an engine;

a fuel tank storing a fuel to be supplied to said engine;

a pump feeding the fuel from said fuel tank to said engine; and a check valve for preventing the fuel from flowing-back from said engine to said pump when said pump stops operating, said check valve including:

a valve casing including a fuel passage through which the fuel discharged from said pump flows, and a first valve seat formed in said fuel passage;

a pressure adjusting valve body slidably provided in said valve casing, said pressure adjusting valve body including a fluid passage thereinside and a second valve seat;

an urging means for urging said pressure adjusting valve body toward a flowing direction of the fuel discharged from said pump for allowing said pressure adjusting valve body to contact said first valve seat; and a check valve body provided in said valve casing, said check valve body moving with respect to said second valve seat, said check valve body leaving said second valve seat, wherein when said pump operates, said check valve body leaves said second valve seat due to a pump side fuel pressure for opening said fluid passage inside said pressure adjusting valve body, when said pump does not operate, said check valve body contacts said second valve seat due to an engine side fuel pressure for closing said fluid passage inside said pressure adjusting valve body, when said pump stops operating and the engine side fuel pressure exceeds a pressure corresponding to an urging force of said urging means, said pressure adjusting valve body leaves said first valve seat with said check valve body for providing a gap between said pressure adjusting valve body and said first valve seat, and fuel remaining at an engine side with respect to said check valve body is released through the gap.

* * * * *